(12) United States Patent
Carnevale et al.

(10) Patent No.: US 10,387,811 B2
(45) Date of Patent: Aug. 20, 2019

(54) OPTIMALLY REARRANGING TEAM MEMBERS IN AN AGILE ENVIRONMENT

(71) Applicant: INTERNATIONAL BUSINESS MACHINES CORPORATION, Armonk, NY (US)

(72) Inventors: Giulia Carnevale, Rome (IT); Marco Gianfico, Sant'Antimo (IT); Roberto Ragusa, Rome (IT); Sidharth Ullal, Adyar (IN)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 15/249,893

(22) Filed: Aug. 29, 2016

(65) Prior Publication Data
US 2018/0060785 A1   Mar. 1, 2018

(51) Int. Cl.
*G06Q 10/06* (2012.01)

(52) U.S. Cl.
CPC ............ *G06Q 10/063112* (2013.01); *G06Q 10/06313* (2013.01)

(58) Field of Classification Search
CPC ............ G06Q 10/06313; G06Q 10/063112
See application file for complete search history.

(56) References Cited

U.S. PATENT DOCUMENTS 8,352,341 B1 * 1/2013 Greenberg ....... G06Q 10/06311 705/35
9,852,388 B1 * 12/2017 Swieter ............ G06Q 10/06313
(Continued)

FOREIGN PATENT DOCUMENTS

JP    2005128930    5/2005

OTHER PUBLICATIONS

Ameen, A. (2012). Project success: Combining project manager skills with project tools and techniques (Order No. 1512020). Available from ProQuest Dissertations and Theses Professional. (1022043664). Retrieved from https://dialog.proquest.com/professional/docview/1022043664?accountid=161862 (Year: 2012).*

(Continued)

*Primary Examiner* — Tyler W Knox
*Assistant Examiner* — Nicholas D Bolen
(74) *Attorney, Agent, or Firm* — Schmeiser, Olsen & Watts; Isaac J. Gooshaw

(57) ABSTRACT

An approach is provided for rearranging assignments of workers to teams in an agile environment. Project requirements are collected and skills of workers are determined. Based on the project requirements and the skills, an initial arrangement of assignments of the workers to the teams is generated. During project execution, data from sensors worker locations and content of communications among the workers are obtained. The data from the sensors identifies workers who are sitting on chairs. Based on the data from the sensors, worker locations, and the content of the communications, a weighted graph is generated that represents the workers, strengths of relationships among the workers, and strengths of relationships between the workers and the teams. Based on the weighted graph, an optimal rearrangement of the assignments of the workers to the teams is automatically and dynamically generated. The optimal rearrangement specifies a match between the skills and the project requirements.

17 Claims, 4 Drawing Sheets

(56) References Cited

U.S. PATENT DOCUMENTS

| | | | |
|---|---|---|---|
| 9,921,726 B1* | 3/2018 | Sculley | H04W 4/04 |
| 9,955,318 B1* | 4/2018 | Scheper | H04W 4/043 |
| 2007/0260506 A1* | 11/2007 | Fitzpatrick | G06Q 10/063116 |
| | | | 705/7.16 |
| 2009/0100165 A1* | 4/2009 | Wesley, Sr. | G06F 15/173 |
| | | | 709/223 |
| 2009/0187451 A1* | 7/2009 | Omiya | G06Q 10/00 |
| | | | 705/7.16 |
| 2009/0240551 A1* | 9/2009 | Writz | G06Q 10/06 |
| | | | 705/7.14 |
| 2013/0159939 A1 | 6/2013 | Krishnamurthi | |
| 2014/0288714 A1 | 9/2014 | Poivet | |
| 2014/0309963 A1* | 10/2014 | Tsukamoto | G01C 21/12 |
| | | | 702/150 |
| 2015/0074032 A1 | 3/2015 | Regehr et al. | |
| 2015/0207828 A1* | 7/2015 | Buddenbaum | H04L 65/1053 |
| | | | 709/205 |
| 2015/0301579 A1* | 10/2015 | Vaccari | G06F 16/9537 |
| | | | 713/340 |
| 2016/0034841 A1* | 2/2016 | Matula | G06Q 10/063112 |
| | | | 705/7.14 |
| 2016/0055443 A1* | 2/2016 | Chee | G06Q 10/063112 |
| | | | 705/7.14 |
| 2016/0171633 A1* | 6/2016 | DeWalt | G06Q 50/08 |
| | | | 705/7.15 |
| 2016/0275434 A1* | 9/2016 | Briganti | G06Q 10/06398 |
| 2017/0154296 A1* | 6/2017 | Guo | G06Q 10/063112 |
| 2017/0266565 A1* | 9/2017 | Choudhuri | A63F 13/795 |
| 2018/0032933 A1* | 2/2018 | Guthridge | G06Q 10/06313 |

OTHER PUBLICATIONS

Olguin-Olguin, Daniel et al.; Sensor-based organisational design and engineering; Int. J. Organisational Design and Engineering; vol. 1, Nos. 1/2; 2010; pp. 69-97.

* cited by examiner

OPTIMALLY REARRANGING TEAM MEMBERS IN AN AGILE ENVIRONMENT

BACKGROUND

The present invention relates to managing resources in a collaborative environment, and more particularly to reconfiguring membership of work teams of a project in an agile environment.

In an agile environment, a project manager and/or a scrum master rearranges a team based on sprint planning. Team members are assigned rooms or tables, where each room or table has a dedicated sprint board. During a daily standup in the agile environment, stories are assigned to a team. Due to an iterative nature of the sprint planning activity, the team member composition of teams is in flux. For example, a story is assigned on a particular day to Team T1 and Person A has been previously assigned to Team T2. In this example, the skills needed to complete the story are identified and Person A is identified as a person who has those skills. Because Person A is identified as having the required skills, Person A may be manually reassigned from Team T2 to Team T1.

SUMMARY

In a first embodiment, the present invention provides a method of rearranging assignments of workers to teams in an agile environment. The method includes a computer collecting requirements of a project and determining skills of workers. The method further includes, during a preliminary phase that precedes an execution of the project and based on the requirements of the project and the skills, the computer generating an initial arrangement of assignments of the workers to the teams. The method further includes, during the execution of the project, the computer obtaining data from sensors which (i) indicates that one or more people are sitting on chairs and (ii) identifies the one or more people as being one or more workers assigned to the teams. The method further includes, during the execution of the project, the computer obtaining information about a location of the workers from smart devices. The method further includes, during the execution of the project, the computer obtaining content of intranet chat and email communications among the workers. The method further includes, during the execution of the project and based on the data from the sensors, the information about the location of the workers, and the content of the intranet chat and email communications, the computer generating a weighted graph that represents the workers, strengths of relationships among the workers, and strengths of relationships between the workers and the teams. The method further includes, during the execution of the project and based on the weighted graph, the computer automatically and dynamically generating an optimal rearrangement of the assignments of the workers to the teams. The optimal rearrangement specifies a match between the skills of the workers and the requirements of the project.

In a second embodiment, the present invention provides a computer program product including a computer-readable storage medium and a computer-readable program code stored in the computer-readable storage medium. The computer-readable program code includes instructions that are executed by a central processing unit (CPU) of a computer system to implement a method of rearranging assignments of workers to teams in an agile environment. The method includes the computer system collecting requirements of a project and determining skills of workers. The method further includes, during a preliminary phase that precedes an execution of the project and based on the requirements of the project and the skills, the computer system generating an initial arrangement of assignments of the workers to the teams. The method further includes during the execution of the project, the computer system obtaining data from sensors which (i) indicates that one or more people are sitting on chairs and (ii) identifies the one or more people as being one or more workers assigned to the teams. The method further includes, during the execution of the project, the computer system obtaining information about a location of the workers from smart devices. The method further includes, during the execution of the project, the computer system obtaining content of intranet chat and email communications among the workers. The method further includes, during the execution of the project and based on the data from the sensors, the information about the location of the workers, and the content of the intranet chat and email communications, the computer system generating a weighted graph that represents the workers, strengths of relationships among the workers, and strengths of relationships between the workers and the teams. The method further includes, during the execution of the project and based on the weighted graph, the computer system automatically and dynamically generating an optimal rearrangement of the assignments of the workers to the teams. The optimal rearrangement specifies a match between the skills of the workers and the requirements of the project.

In a third embodiment, the present invention provides a computer system including a central processing unit (CPU); a memory coupled to the CPU; and a computer-readable storage device coupled to the CPU. The storage device includes instructions that are executed by the CPU via the memory to implement a method of rearranging assignments of workers to teams in an agile environment. The method includes the computer system collecting requirements of a project and determining skills of workers. The method further includes, during a preliminary phase that precedes an execution of the project and based on the requirements of the project and the skills, the computer system generating an initial arrangement of assignments of the workers to the teams. The method further includes, during the execution of the project, the computer system obtaining data from sensors which (i) indicates that one or more people are sitting on chairs and (ii) identifies the one or more people as being one or more workers assigned to the teams. The method further includes, during the execution of the project, the computer system obtaining information about a location of the workers from smart devices. The method further includes, during the execution of the project, the computer system obtaining content of intranet chat and email communications among the workers. The method further includes, during the execution of the project and based on the data from the sensors, the information about the location of the workers, and the content of the intranet chat and email communications, the computer system generating a weighted graph that represents the workers, strengths of relationships among the workers, and strengths of relationships between the workers and the teams. The method further includes, during the execution of the project and based on the weighted graph, the computer system automatically and dynamically generating an optimal rearrangement of the assignments of the workers to the teams. The optimal rearrangement specifies a match between the skills of the workers and the requirements of the project.

Embodiments of the present invention enhance productivity and improve cost efficiency of work teams in an agile environment by reconfiguring members of work teams. Other embodiments of the present invention reconfigure work teams to improve energy management by decreasing energy costs associated with office space used in an agile environment.

DETAILED DESCRIPTION

Overview

Embodiments of the present invention collect worker location data within building(s), data about workers' chair usage provided by sensors on or in proximity to chairs, worker-to-worker proximity data, skills of workers, intranet chat and email communications, sprint planning data, and assignment of stories in an agile environment. The aforementioned data is used to determine an optimal rearrangement of team members in the agile environment as teams change from one sprint iteration to the next. The optimal rearrangement of team members can include an optimal rearrangement of seats in an office environment, which includes an assignment of chairs to respective team members.

The optimal rearrangement of team members includes reassigning one or more workers to one or more other teams to enhance productivity and cost efficiency in completing a project, and to reduce or eliminate human error in assigning workers to teams. In other embodiments, the utilization of the aforementioned data to reassign workers to teams in the agile environment reduces energy consumption and costs of workers' energy footprints. Embodiments of the present invention determine the rearrangement of team members by utilizing a weighted graph that describes the strength of a worker's relation to other workers and describes the relation of the worker to the worker's current team and to other teams.

Administrators in an agile environment face unique challenges in rearranging team members in an agile environment. The administrators may use known space management software to manage assets and resources, but such management is static and does not address a rearrangement of team membership in an agile environment. Other known, non-automated techniques of rearranging team members are prone to human error. Embodiments of the present invention dynamically acquire data about worker location, chair usage, sprint planning, assignment of stories, project requirements, worker skills, and chat and email communications of workers, and use this dynamically acquired data to generate weighted graphs representing worker relationships to workers and to teams, where the graphs are used to accurately determine an optimal rearrangement of team members in an agile environment at the end of a work day or at the completion of a sprint iteration. The weighted graphs provide an optimal rearrangement of team members, so that a project on which the team members work is more likely to be completed on time and with less cost.

As used herein, an agile environment is defined as an environment in which principles of agile software development are implemented. Agile software development principles include best requirements and solutions emerging from collaboration between self-organizing and cross-functional teams, adaptive planning, evolutionary development, early delivery, continuous improvement, and rapid and flexible response to change.

System for Optimal Rearrangement of Team Members in an Agile Environment

Figure 1:
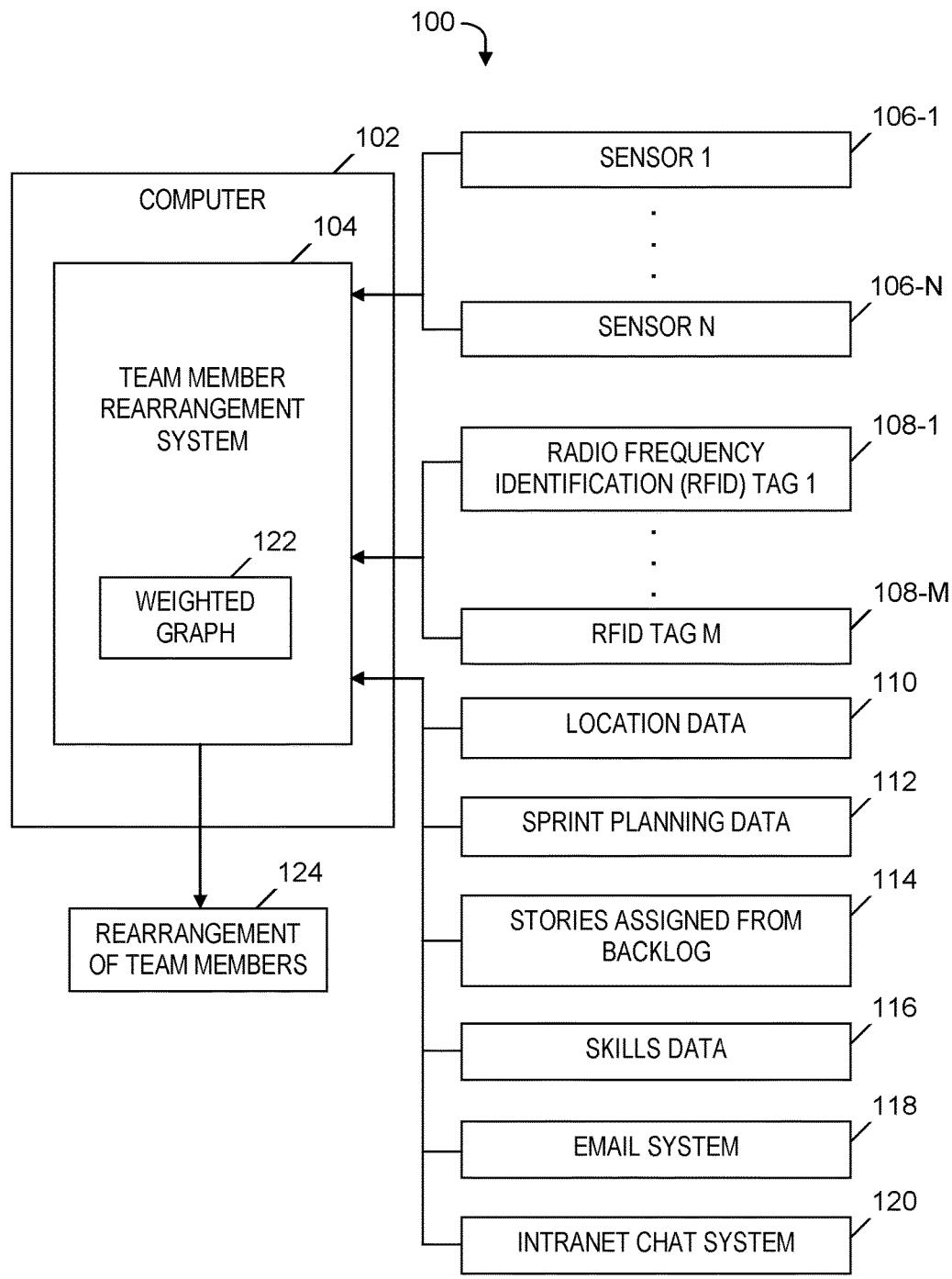
FIG. 1 is a block diagram of a system for optimal rearrangement of team members in an agile environment, in accordance with embodiments of the present invention.

FIG. 1 is a block diagram of a system 100 for optimal rearrangement of team members in an agile environment, in accordance with embodiments of the present invention. System 100 includes a computer 102, which executes a software-based team member rearrangement system 104 which optimally rearranges assignments of workers to teams in an agile environment.

Team member rearrangement system 104 receives data from N sensors 106-1, . . . , 106-N coupled to N respective chairs in building(s) in which the workers work, where N is an integer greater than one. Each of the sensors 106-1, . . . , 106-N is configured to detect the presence of a person sitting on the chair to which the sensor is coupled. Examples of sensors 106-1, . . . , 106-N include pressure sensors and temperature sensors. In one embodiment, each of the sensors 106-1, . . . , 106-N is configured to detect the presence of a person sitting on a corresponding chair and to identify the person as a particular worker who is assigned to one of the teams (e.g., by checking the particular badge of the worker to which the chair is assigned). Each of the sensors 106-1, . . . , 106-N is triggered when a person sits on or gets up from the corresponding chair, and a timer (not shown) coupled to the sensor detects an amount of time the person sits on the chair. In one embodiment, one or more the sensors 106-1, . . . , 106-N are pressure sensor(s) that are triggered by respective person(s) sitting in corresponding chair(s) and thereby increasing the pressure exerted on the chair(s). A pressure sensor distinguishes between a person seated on the chair and a bag or other item placed on the chair based on a difference between a weight of a person and a weight of a portable item that is typically placed on a chair.

Team member rearrangement system 104 in real time tracks workers' locations on office floors within building(s) in which the workers work by receiving data from M radio frequency identification (RFID) tags 108-1, . . . , 108-M, where M is an integer greater than one, and where the RFID tags 108-1, . . . , 108-M are carried by, attached to clothing worn by, included in items carried by, or are otherwise kept in proximity to corresponding workers. In one embodiment, RFID tags 108-1, . . . , 108-M include RFID tags included in workers' identification cards. RFID readers in the building(s) track the position of RFID tags 108-1, . . . , 108-M, which tracks the locations of the workers. In one embodiment, RFID tags 108-1, . . . , 108-M are detected by RFID scanners attached to the chairs in the building(s), where the RFID scanners identify the workers who are in proximity to chairs.

Using the data from sensors 106-1, . . . , 106-N and RFID tags 108-1, . . . , 108-M, team member rearrangement system 104 detects the particular workers who are sitting on corresponding chairs and determines how long each of the particular workers uses the corresponding chair.

Team member rearrangement system 104 obtains location data 110 of workers by sending signals to workers' mobile devices via beacons (e.g., Bluetooth® beacons). Bluetooth is a registered trademark owned by Bluetooth SIG, Inc. located in Kirkland, Wash.

Team member rearrangement system 104 receives sprint planning data 112, which includes project requirements, skills, and stories required to complete a project. As used herein, sprint (also known as (a.k.a.) "iteration") is defined as a one week to one month period of time (or other short period of time) during which a team has committed to specific goals. Sprint is a basic unit of development in scrum. Scrum is an iterative and incremental development framework for managing product development. As used herein, a story (a.k.a. "user story") is defined as a description consisting of one or more sentences in the everyday language or business language of a user of a system, which captures what the user does or needs to do as part of her or his job function. Stories are the basis for defining the functions a business system must provide and to facilitate requirements management. Stories are similar to use case descriptions in object-oriented development.

Team member rearrangement system 104 obtains stories assigned from backlog 114. The backlog may be a product backlog (i.e., an ordered list of requirements that a team maintains for a product) or sprint backlog (i.e., a list of work a team must address during the next sprint).

Team member rearrangement system 104 obtains skills data 116, which includes an identification of skill(s) of each of the workers.

Team member rearrangement system 104 obtains content from email system 118 and intranet chat system 120, where the content is authored by the workers.

Using data from sensors 106-1, ..., 106-N and RFID tags 108-1, ..., 108-M, location data 110, sprint planning data 112, stories assigned from backlog 114, skills data 116, and content from email system 118 and intranet chat system 120, team member rearrangement system generates a weighted graph 122 having nodes representing workers and edges representing relationships among the workers and between the workers and the teams. The weight of an edge between two nodes representing first and second workers indicates a proximity between the first and second workers in a specified period of time based on the data from sensors 106-1, ..., 106-N and RFID tags 108-1, ..., 108-M, location data 110, and content from email system 118 and intranet chat system 120. A weight of an edge connecting a node representing a worker to a particular team is based in part on how well the skills of the worker match skills required by the team to complete a project and a proximity between the worker and members of the team.

Using weighted graph 122, team member rearrangement system 104 generates an optimal rearrangement of team members 124 to increase productivity of the workers in completing the project and decrease costs of completing the project. The automated generation of rearrangement of team members 124 also reduces human error that is associated with known techniques of manually rearranging team members.

In one embodiment, team member rearrangement system 104 receives energy consumption data (not shown) for rooms and floors of the building(s) in which the workers work and costs of energy footprints (not shown) of the workers. Team member rearrangement system 104 uses the energy consumption data and costs of energy footprints to generate rearrangement of team members 124 to decrease energy costs.

Figure 2:
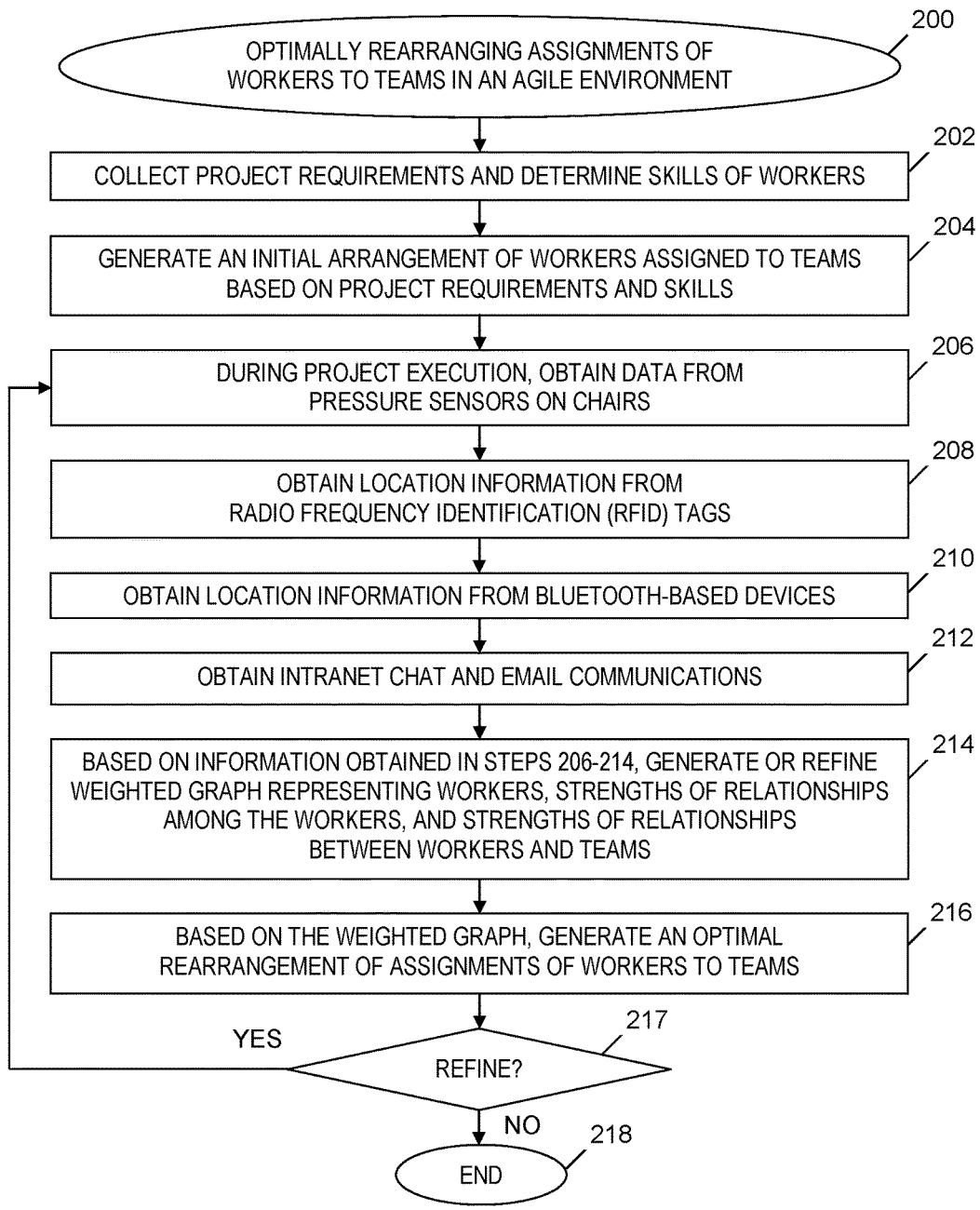
FIG. 2 is a flowchart of a process for optimal rearrangement of team members in an agile environment, where the process is implemented in the system of FIG. 1, in accordance with embodiments of the present invention.
Figure 3:
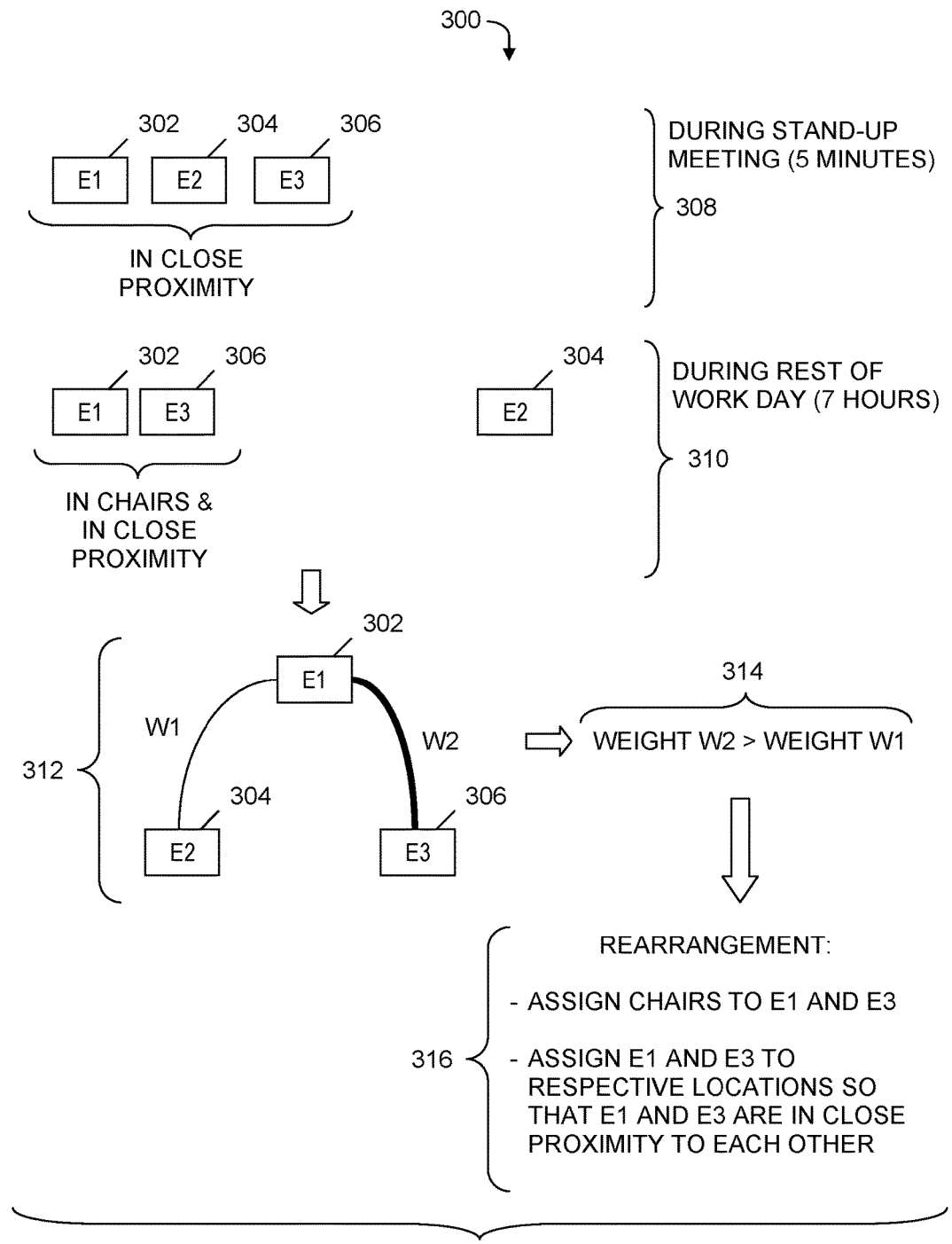
FIG. 3 is an example of rearranging team members in the process of FIG. 2, in accordance with embodiments of the present invention.

The functionality of the components shown in FIG. 1 is described in more detail in the discussion of FIG. 2 and FIG. 3 presented below.

Process for Optimal Rearrangement of Team Members in an Agile Environment

FIG. 2 is a flowchart of a process for optimal rearrangement of team members in an agile environment, where the process is implemented in the system of FIG. 1, in accordance with embodiments of the present invention. The process of FIG. 2 starts at step 200. In step 202, team member rearrangement system 104 (see FIG. 1) collects requirements of a project and determines skills of workers. In one embodiment, the requirements of the project are included in spring planning data 112 (see FIG. 1) and the skills of the workers are identified in skills data 116 (see FIG. 1).

In step 204, during a preliminary phase that precedes a project execution phase, team member rearrangement system 104 (see FIG. 1) generates an initial arrangement of workers assigned to teams based on the project requirements collected in step 202 and the skills of the workers determined in step 202.

In one embodiment, step 202 includes team member rearrangement system 104 (see FIG. 1) determining a match between a skill of a worker and a skill required by a project. Step 204 also includes, based on the match between the skill of the worker and the skill required by the project, team member rearrangement system 104 (see FIG. 1) determining a strength of a relationship between the worker and a team to which the project is assigned. Step 204 also includes, based at least in part on the strength of the relationship between the worker and the team, team member rearrangement system 104 (see FIG. 1) assigning the worker to the team as part of the initial arrangement.

In step 206, during the project execution phase, team member rearrangement system 104 (see FIG. 1) obtains data from sensors 106-1, ..., 106-N (see FIG. 1) on or in proximity to chairs in building(s) in which the workers work. The data from sensors 106-1, ..., 106-N (i) indicates that one or more people are sitting on the aforementioned chairs and (ii) identifies the one or more people as being one or more of the aforementioned workers who are assigned to respective teams.

In step 208, during the project execution phase, team member rearrangement system 104 (see FIG. 1) obtains information about locations of the workers on floors of the building(s) from RFID tags 108-1, ..., 108-M (see FIG. 1).

In step 210, during the project execution phase, team member rearrangement system 104 (see FIG. 1) obtains other information about the locations of the workers on the aforementioned floors from beacons or other Bluetooth®-based devices sending signals to the workers' mobile devices.

In step 212, during the project execution phase, team member rearrangement system 104 (see FIG. 1) obtains content from email system 118 (see FIG. 1) and intranet chat system 120 (see FIG. 1), where the content is authored by one or more of the workers.

In step 214, based on the data obtained from sensors 106-1, ..., 106-N (see FIG. 1), location information obtained from RFID tags 108-1, ..., 108-M (see FIG. 1), location data 110 (see FIG. 1), and content obtained from email system 118 (see FIG. 1) and intranet chat system 120 (see FIG. 1), team member rearrangement system 104 (see FIG. 1) generates weighted graph 122 (see FIG. 1), whose nodes represent the workers, and whose edges represent strengths of relationships among workers and strengths of relationships between workers and teams (i.e., the team of which a worker is currently a member, as well as other teams).

Weighted graph 122 (see FIG. 1) describes a relation between a worker and other workers, a relation between the worker and the worker's team, and a relation between the worker and other teams. The relation between the worker and a team is a sum of the relation the worker has with all other workers on the team plus a weight indicating how much the worker's skill matches the skills needed by stories that are assigned to the team in the next sprint iteration.

Following step 214, team member rearrangement system 104 (see FIG. 1) analyzes weighted graph 122 (see FIG. 1) to determine a strength of a relation between workers based on proximity of nodes representing the workers in weighted graph 122 (see FIG. 1), and to determine how much time a worker spends sitting in a chair based on a weight on the node representing the worker in weighted graph 122 (see FIG. 1). The analysis is also performed at the end of each work day and uses knowledge of a project plan, a sprint plan, assignments on backlog, the skill set of workers, and the skills required by a story to determine those nodes of weighted graph 122 (see FIG. 1) that need to be closest together (i.e., the workers that need to be in proximity to each other to enhance productivity), as well as those nodes that use chairs the most (i.e., the workers that use chairs the most).

In one embodiment, generating weighted graph 122 (see FIG. 1) in step 214 includes (1) generating nodes of weighted graph 122 (see FIG. 1), where the nodes represent respective workers and (2) generating edges of weighted graph 122 (see FIG. 1), where each edge is between a corresponding two nodes included in the aforementioned generated nodes and represents a relationship between two workers represented by the two nodes, respectively. In the embodiment described in this paragraph, step 214 also includes, based on the data from the sensors 106-1, . . . , 106-N (see FIG. 1), location data 110 (see FIG. 1), and content from email system 118 (see FIG. 1) and intranet chat system 120 (see FIG. 1), team member rearrangement system 104 (see FIG. 1) determining strengths of relationships among the workers, and based on the strengths of the relationships, determining weights of respective edges of weighted graph 122 (see FIG. 1).

In step 216, during the project execution phase and based on weighted graph 122 (see FIG. 1), team member rearrangement system 104 (see FIG. 1) automatically and dynamically generates an optimal rearrangement 124 (see FIG. 1) of assignments of the workers to the teams. After step 216, the computer receives an indication that the workers are assigned or reassigned to teams according to optimal rearrangement 124 (see FIG. 1).

In step 217, team member rearrangement system 104 (see FIG. 1) determines whether weighted graph 122 (see FIG. 1) is to be refined in an inter-iteration refinement. For example, an owner (e.g., scrum master) of weighted graph 122 (see FIG. 1) not performing an explicit action of clearing the values in weighted graph 122 (see FIG. 1) after step 216 is an indication that the weighted graph 122 (see FIG. 1) is to be refined in an inter-iteration refinement. If weighted graph 122 (see FIG. 1) is to be refined according to the determination made in step 217, then the Yes branch of step 217 is taken and the process of FIG. 2 loops back to step 206 to repeat steps 206, 208, 210, 212, 214, and 216 to provide different weights to the connections in weighted graph 122 (see FIG. 1) that were created in step 214 in one or more previous iterations. In one embodiment, the aforementioned loop back to step 206 provides a periodic generation of updated optimal rearrangements of assignments of workers to teams at predefined time intervals (e.g., at the end of each work day or at the end of a sprint).

If weighted graph 122 (see FIG. 1) is not to be refined according to the determination made in step 217, then the No branch of step 217 is taken and the process of FIG. 2 ends at step 218.

In one embodiment, based on the data from the sensors 106-1, . . . , 106-N (see FIG. 1), location data 110 (see FIG. 1), and content from email system 118 (see FIG. 1) and intranet chat system 120 (see FIG. 1), step 214 includes team member rearrangement system 104 (see FIG. 1) determining that a first worker currently assigned to a first team and a second worker currently assigned to a second team are in proximity to each other for an amount of time that exceeds a predetermined threshold amount, where the first and second teams are different teams. Step 214 also includes team member rearrangement system 104 (see FIG. 1) determining that a skill of the second worker is included in a set of skills required by a project assigned to the first team. Step 214 also includes, based on the first and second workers being in proximity for the amount of time that exceeds the predetermined threshold amount and the skill of the second worker being included in the required set of skills, team member rearrangement system 104 (see FIG. 1) increasing a weight assigned to an edge of weighted graph 122 (see FIG. 1) that represents a strength of a relationship between the first and second workers. Step 216 further includes, based on the increased weight assigned to the edge of weighted graph 122 (see FIG. 1), team member rearrangement system 104 (see FIG. 1) reassigning the second worker from the second team to the first team.

In one embodiment, step 214 includes, based on the data from the sensors 106-1, . . . , 106-N (see FIG. 1), location data 110 (see FIG. 1), and content from email system 118 (see FIG. 1) and intranet chat system 120 (see FIG. 1), team member rearrangement system 104 (see FIG. 1) determining a first worker is in proximity to a second worker for a first amount of time that exceeds a first threshold amount, where the first worker is currently assigned to a first team and the second worker is currently assigned to a second team, and where the first and second teams are different teams. Step 214 also includes, based on data from the sensors 106-1, . . . , 106-N (see FIG. 1) and location data 110 (see FIG. 1), team member rearrangement system 104 (see FIG. 1) determining that the first and second workers are seated in respective chairs for respective amounts of time that each exceed a second threshold amount. Step 214 also includes, based on the first and second workers being in proximity for the first amount of time that exceeds the predetermined threshold amount, team member rearrangement system 104 (see FIG. 1) increasing a first weight assigned to an edge of weighted graph 122 (see FIG. 1) that represents a strength of a relationship between the first and second workers. Step 214 includes, based on the first and second workers being seated for the amounts of time that each exceed the second threshold amount, team member rearrangement system 104 (see FIG. 1) increasing two weights assigned to first and second nodes, respectively, of weighted graph 122 (see FIG. 1), where the first and second nodes represent the first and second workers, respectively. Step 214 further includes, based on the increased first weight assigned to the edge and the increased two weights assigned to the first and second nodes, team member rearrangement system 104 (see FIG. 1) assigning the first and second workers to first and second chairs, respectively, where the first and second chairs are in proximity to each other. The step of assigning the first and second workers to the first and second chairs results in an enhancement of a collaboration between the first and second workers.

In one embodiment, team member rearrangement system 104 (see FIG. 1) repeats steps 206, 208, 210, 212, 214, and 216 periodically so that team member rearrangement system 104 (see FIG. 1) refines weighted graph 122 (see FIG. 1) and generates updated optimal rearrangements of assignments of workers to teams at predefined time intervals (e.g., at the end of each work day or at the end of a sprint). During the repeated performances of step 214, team member rearrangement system 104 (see FIG. 1) refines the weighted graph 122 (see FIG. 1) that had been generated or refined in the most recent previous performance of step 214.

Rules received by team member rearrangement system 104 (see FIG. 1) are associated with the dynamically acquired data (i.e., data about worker location, chair usage, sprint planning, assignment of stories, project requirements, worker skills, and chat and email communications of workers). In an alternate embodiment, the dynamically acquired data associated with the rules also includes room and floor energy consumption data and costs of energy footprints of workers. The rules are used to continuously refine weighted graph 122 (see FIG. 1). In one embodiment, each rule associates a weight in the closed interval [0,1] with the aforementioned dynamically acquired data to indicate the extent to which the data is involved in a recommendation for rearranging team members that is based on weighted graph 122 (see FIG. 1).

In one embodiment, team member rearrangement system 104 (see FIG. 1) generates an enhanced graph in step 214 so that the enhanced graph also includes information about energy consumption for rooms and floors of the building(s) in which the workers work and costs of energy footprints of the workers. Based on the enhanced graph that includes information about energy consumption and costs of energy footprints, team member rearrangement system 104 (see FIG. 1) manages energy usage in step 216 by generating an optimal rearrangement and placement of team members in rooms. The optimal placement of the team members in rooms allows one or more rooms that were previously used to now be vacant, thereby decreasing the amount of energy consumed because heating or cooling of the aforementioned one or more vacant rooms can be adjusted or eliminated. For example, after a team has been reduced to 75% of its initial size, and based on the enhanced graph generated in step 214, the size of the team, and the availability of chairs in rooms, team member rearrangement system 104 (see FIG. 1) generates a recommendation to leave some rooms vacant for the purpose of saving energy.

Example

FIG. 3 is an example 300 of rearranging team members in the process of FIG. 2, in accordance with embodiments of the present invention. Prior to the start of example 300, team member rearrangement system 104 (see FIG. 1) generates an initial arrangement of three employees E1, E2, and E3. In the initial arrangement chairs are not assigned to E1 and E2 and E1 and E2 are assigned to locations so that E1 and E2 are not in close proximity to each other.

In example 300, team member rearrangement system 104 (see FIG. 1) obtains data in steps 204, 206, and 208 (see FIG. 2), which indicates locations of employees 302, 304, and 306 (i.e., employees E1, E2, and E3, respectively) throughout a work day. During a first time period 308 at the beginning of the work day, team member rearrangement system 104 (see FIG. 1) obtains data from sensors 106-1, . . . , 106-N (see FIG. 1) and location data 110 (see FIG. 1), which indicates that employees E1, E2, and E3 are in close proximity to each other and are not using chairs. Employees E1, E2, and E3 are in a five-minute stand-up meeting during first time period 308.

During a second time period 310 which includes the rest of the work day (i.e., a seven-hour period following the stand-up meeting), team member rearrangement system 104 (see FIG. 1) obtains data from sensors 106-1, . . . , 106-N (see FIG. 1) and location data 110 (see FIG. 1), which indicates that employees E1 and E3 are in close proximity to each other during second time period 310 and are using chairs during most of second time period 310. The data obtained during second time period 310 also indicates that employee E2 is not using chair for most of second time period 310 and is not in close proximity to employees E1 and E3.

A portion 312 of weighted graph 122 (see FIG. 1) generated in step 214 (see FIG. 2) indicates a first weight W1 assigned to the relationship between employees E1 and E2 (i.e., a first weight assigned to the edge between the nodes representing E1 and E2) and a second weight W2 assigned to the relationship between employees E1 and E3 (i.e., a second weight assigned to the edge between the nodes representing E1 and E3. A result 314 of an analysis of weighted graph 122 (see FIG. 1) in step 214 (see FIG. 2) indicates that weight W2 is greater than weight W1 because of the substantial amount of time that E1 spends in close proximity to E3 and the relatively small amount of time that E1 spends in close proximity to E2.

Although not shown in the portion 312, other weights assigned to the nodes representing employees E1 and E3 indicate the substantial amount of time that E1 and E3 spend seated in chairs during the work day.

Based on the weights W1 and W2, the result 314, and the other weights indicating the substantial amount of time that employees E1 and E3 spend seated in chairs, step 216 (see FIG. 2) includes team member rearrangement system 104 (see FIG. 1) generating an optimal rearrangement 316 of employees E1, E2, and E3 for the next sprint iteration, which includes an assignment of chairs to E1 and E3 and an assignment of E1 and E3 to respective locations so that E1 and E3 are in close proximity to each other during the work day.

Computer System

Figure 4:
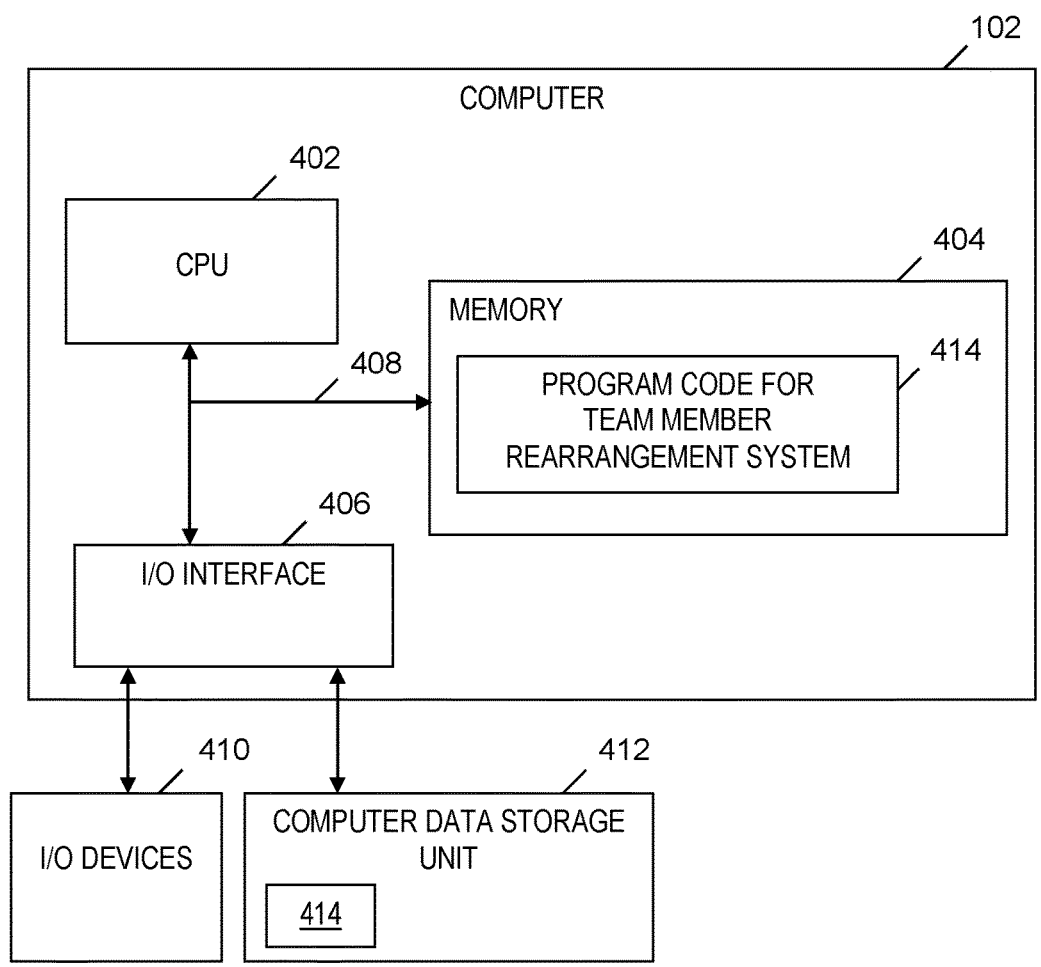
FIG. 4 is a block diagram of a computer that is included in the system of FIG. 1 and that implements the process of FIG. 2, in accordance with embodiments of the present invention.

FIG. 4 is a block diagram of a computer that is included in the system of FIG. 1 and that implements the process of FIG. 2, in accordance with embodiments of the present invention. Computer 102 is a computer system that generally includes a central processing unit (CPU) 402, a memory 404, an input/output (I/O) interface 406, and a bus 408. Computer 102 is coupled to I/O devices 410 and a computer data storage unit 412. CPU 402 performs computation and control functions of computer 102, including executing instructions included in program code 414 for team member rearrangement system 104 (see FIG. 1) to perform a method of rearranging assignments of workers to teams in an agile environment, where the instructions are executed by CPU 402 via memory 404. CPU 402 may include a single processing unit, or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display device, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes a known computer-readable storage medium, which is described below. In one embodiment, computer data storage unit 412 is a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 that includes instructions that are executed by CPU 402 via memory 404 to rearrange assignments of workers to teams in an agile environment. Although FIG. 4 depicts memory 404 as including program code 414, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

Storage unit 412 may store data from sensors 106-1, ..., 106-N (see FIG. 1), RFID tag 108-1, ..., 108-M, content from email system 118 (see FIG. 1), intranet chat system 120 (see FIG. 1), location data 110 (see FIG. 1), sprint planning data 112 (see FIG. 1), stories assigned from a backlog 114 (see FIG. 1), and skills data 116 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to rearranging assignments of workers to teams in an agile environment. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to rearrange assignments of workers to teams in an agile environment. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of rearranging assignments of workers to teams in an agile environment.

While it is understood that program code 414 for rearranging assignments of workers to teams in an agile environment may be deployed by manually loading directly in client, server and proxy computers (not shown) via loading a computer-readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of rearranging assignments of workers to teams in an agile environment. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIGS. 2A-2B) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of rearranging assignments of workers to teams in an agile environment to manage energy usage, the method comprising the steps of:
   a computer collecting requirements of a project and determining skills of workers;
   during a preliminary phase that precedes an execution of the project and based on the requirements of the project and the skills, the computer generating an initial arrangement of assignments of the workers to the teams;
   during the execution of the project, the computer obtaining data from sensors which (i) indicates that one or more people are sitting on chairs and (ii) identifies the one or more people as being one or more of the workers assigned to the teams, wherein the sensors are coupled to the chairs, respectively, and wherein the obtained data is based on the sensors detecting the one or more people sitting on the chairs by detecting, for a given person sitting in a given chair, an increase in pressure exerted on the given chair by the given person;

during the execution of the project, the computer obtaining information about a location of the workers from smart devices;

during the execution of the project, the computer obtaining content of intranet chat and email communications among the workers;

during the execution of the project and based on the data from the sensors, the information about the location of the workers, and the content of the intranet chat and email communications, the computer generating a weighted graph that represents the workers, strengths of relationships among the workers, and strengths of relationships between the workers and the teams;

the computer obtaining data about energy consumption in rooms and floors in one or more buildings in which the workers work;

the computer obtaining costs of energy footprints of respective workers, wherein the step of generating the weighted graph is further based on the data about the energy consumption and the costs of the energy footprints of the respective workers;

based on the weighted graph, the computer determining optimal sizes of the teams and an availability of the chairs for the teams;

based on the weighted graph, the sizes of the teams, and the availability of the chairs, the computer determining an optimal usage of the chairs and the rooms in the agile environment, which allows one or more rooms that were previously being used to be left empty;

the computer receiving an indication that the one or more rooms are left empty based on the optimal usage of chairs and the rooms, the empty one or more rooms using less energy than the one or more rooms had used prior to being left empty; and during the execution of the project, the computer decreasing an amount of energy used in the one or more rooms that were previously being used and are being left empty by adjusting heating or cooling in the one or more rooms and by automatically and dynamically generating an optimal rearrangement of the assignments of the workers to the teams by using (i) the data about energy consumption in the rooms and the floors in the one or more buildings in which the workers work, (ii) the costs of the energy footprints of the respective workers, and (iii) the weighted graph which represents the workers, the strengths of relationships among the workers, and the strengths of the relationships between the workers and the teams, and which is based on the data from the sensors, the information about the location of the workers obtained from the smart devices, and the content of the intranet chat and the email communications among the workers, wherein the optimal rearrangement specifies a match between the skills of the workers and the requirements of the project.

2. The method of claim 1, further comprising the step of the computer rearranging the assignments of the workers to the teams based on the optimal rearrangement, wherein a result of the step of rearranging the assignments of the workers to the teams is an increase in productivity of the workers in completing the project, a decrease in a cost of completing the project, or the increase in the productivity and the decrease in the cost.

3. The method of claim 1, wherein the step of generating the weighted graph includes:

the computer generating nodes of the weighted graph, the nodes representing respective workers;

the computer generating edges of the weighted graph, each edge being between a corresponding two nodes included in the nodes of the weighted graph and representing a relationship between two workers represented by the two nodes;

based on the data from the sensors, the information about the location of the workers, and the content of the intranet chat and email communications, the computer determining the strengths of the relationships among the workers;

based on the strengths of the relationships among the workers, the computer determining weights of respective edges of the weighted graph.

4. The method of claim 3, further comprising the steps of:

based on the data from the sensors, the information about the location of the workers, and the content of the intranet chat and email communications, the computer determining a first worker currently assigned to a first team and a second worker currently assigned to a second team are in proximity for an amount of time that exceeds a predetermined threshold amount, the first and second teams being different teams;

the computer determining that a skill of the second worker is included in a set of skills required by a project assigned to the first team;

based on the first and second workers being in proximity for the amount of time that exceeds the predetermined threshold amount and the skill of the second worker being included in the required set of skills, the computer increasing a weight assigned to an edge of the weighted graph that represents a strength of a relationship between the first and second workers; and based on the increased weight assigned to the edge of the weighted graph, the computer reassigning the second worker from the second team to the first team.

5. The method of claim 3, further comprising the steps of:

based on the data from the sensors, the information about the location of the workers, and the content of the intranet chat and email communications, the computer determining a first worker is in proximity to a second worker for a first amount of time that exceeds a first threshold amount, the first worker currently assigned to a first team and the second worker currently assigned to a second team, the first and second teams being different teams;

based on the data from the sensors and the information about the location of the workers, the computer determining the first and second workers are seated in respective chairs for respective amounts of time that each exceed a second threshold amount;

based on the first and second workers being in proximity for the first amount of time that exceeds the predetermined threshold amount, the computer increasing a first weight assigned to an edge of the weighted graph that represents a strength of a relationship between the first and second workers;

based on the first and second workers being seated for the amounts of time that each exceed the second threshold amount, the computer increasing second and third weights assigned to first and second nodes, respectively, of the weighted graph that represent the first and second workers, respectively; and based on the increased first, second, and third weights, the computer assigning the first and second workers to first and second chairs, respectively, the first and second chairs being in proximity, wherein the step of assigning results in an enhancement of a collaboration between the first and second workers.

6. The method of claim 1, further comprising the steps of:

the computer determining a match between a skill of a worker and a skill required by the project;

based on the match between the skill of the worker and the skill required by the project, the computer determining a strength of a relationship between the worker and a team to which the project is assigned; and based at least in part on the strength of the relationship between the worker and the team, the computer assigning the worker to the team as part of the initial arrangement.

7. The method of claim 1, further comprising the step of:

providing at least one support service for at least one of creating, integrating, hosting, maintaining, and deploying computer-readable program code in the computer, the program code being executed by a processor of the computer to implement the steps of collecting the requirements of the project, determining the skills of the workers, generating the initial arrangement of assignments of the workers to the teams, obtaining the data from the sensors on the chairs, obtaining the information about the location of the workers, obtaining the content of the intranet chat and email communications, generating the weighted graph, obtaining the data about the energy consumption, obtaining the costs of the energy footprints, determining the optimal sizes of the teams and the availability of the chairs, determining the optimal usage of the chairs and the rooms, receiving the indication that the one or more rooms are left empty, and decreasing the amount of energy used in the one or more rooms.

8. A computer program product, comprising:

a computer-readable storage medium; and a computer-readable program code stored in the computer-readable storage medium, the computer-readable program code containing instructions that are executed by a central processing unit (CPU) of a computer system to implement a method of rearranging assignments of workers to teams in an agile environment to manage energy usage, the method comprising the steps of:

the computer system collecting requirements of a project and determining skills of workers;

during a preliminary phase that precedes an execution of the project and based on the requirements of the project and the skills, the computer system generating an initial arrangement of assignments of the workers to the teams;

during the execution of the project, the computer system obtaining data from sensors which (i) indicates that one or more people are sitting on chairs and (ii) identifies the one or more people as being one or more of the workers assigned to the teams, wherein the sensors are coupled to the chairs, respectively, and wherein the obtained data is based on the sensors detecting the one or more people sitting on the chairs by detecting, for a given person sitting in a given chair, an increase in pressure exerted on the given chair by the given person;

during the execution of the project, the computer system obtaining information about a location of the workers from smart devices;

during the execution of the project, the computer system obtaining content of intranet chat and email communications among the workers;

during the execution of the project and based on the data from the sensors, the information about the location of the workers, and the content of the intranet chat and email communications, the computer system generating a weighted graph that represents the workers, strengths of relationships among the workers, and strengths of relationships between the workers and the teams;

the computer system obtaining data about energy consumption in rooms and floors in one or more buildings in which the workers work;

the computer system obtaining costs of energy footprints of respective workers, wherein the step of generating the weighted graph is further based on the data about the energy consumption and the costs of the energy footprints of the respective workers;

based on the weighted graph, the computer system determining optimal sizes of the teams and an availability of the chairs for the teams;

based on the weighted graph, the sizes of the teams, and the availability of the chairs, the computer system determining an optimal usage of the chairs and the rooms in the agile environment, which allows one or more rooms that were previously being used to be left empty;

the computer system receiving an indication that the one or more rooms are left empty based on the optimal usage of chairs and the rooms, the empty one or more rooms using less energy than the one or more rooms had used prior to being left empty; and during the execution of the project, the computer system decreasing an amount of energy used in the one or more rooms that were previously being used and are being left empty by adjusting heating or cooling in the one or more rooms and by automatically and dynamically generating an optimal rearrangement of the assignments of the workers to the teams by using (i) the data about energy consumption in the rooms and the floors in the one or more buildings in which the workers work, (ii) the costs of the energy footprints of the respective workers, and (iii) the weighted graph which represents the workers, the strengths of relationships among the workers, and the strengths of the relationships between the workers and the teams, and which is based on the data from the sensors, the information about the location of the workers obtained from the smart devices, and the content of the intranet chat and the email communications among the workers, wherein the optimal rearrangement specifies a match between the skills of the workers and the requirements of the project.

9. The computer program product of claim 8, wherein the method further comprises the step of the computer system rearranging the assignments of the workers to the teams based on the optimal rearrangement, wherein a result of the step of rearranging the assignments of the workers to the teams is an increase in productivity of the workers in completing the project, a decrease in a cost of completing the project, or the increase in the productivity and the decrease in the cost.

10. The computer program product of claim 8, wherein the step of generating the weighted graph includes:
  the computer system generating nodes of the weighted graph, the nodes representing respective workers;
  the computer system generating edges of the weighted graph, each edge being between a corresponding two nodes included in the nodes of the weighted graph and representing a relationship between two workers represented by the two nodes;
  based on the data from the sensors, the information about the location of the workers, and the content of the intranet chat and email communications, the computer system determining the strengths of the relationships among the workers;
  based on the strengths of the relationships among the workers, the computer system determining weights of respective edges of the weighted graph.

11. The computer program product of claim 10, wherein the method further comprises the steps of:
  based on the data from the sensors, the information about the location of the workers, and the content of the intranet chat and email communications, the computer system determining a first worker currently assigned to a first team and a second worker currently assigned to a second team are in proximity for an amount of time that exceeds a predetermined threshold amount, the first and second teams being different teams;
  the computer system determining that a skill of the second worker is included in a set of skills required by a project assigned to the first team;
  based on the first and second workers being in proximity for the amount of time that exceeds the predetermined threshold amount and the skill of the second worker being included in the required set of skills, the computer system increasing a weight assigned to an edge of the weighted graph that represents a strength of a relationship between the first and second workers; and
  based on the increased weight assigned to the edge of the weighted graph, the computer system reassigning the second worker from the second team to the first team.

12. The computer program product of claim 10, wherein the method further comprises the steps of:
  based on the data from the sensors, the information about the location of the workers, and the content of the intranet chat and email communications, the computer system determining a first worker is in proximity to a second worker for a first amount of time that exceeds a first threshold amount, the first worker currently assigned to a first team and the second worker currently assigned to a second team, the first and second teams being different teams;
  based on the data from the sensors and the information about the location of the workers, the computer system determining the first and second workers are seated in respective chairs for respective amounts of time that each exceed a second threshold amount;
  based on the first and second workers being in proximity for the first amount of time that exceeds the predetermined threshold amount, the computer system increasing a first weight assigned to an edge of the weighted graph that represents a strength of a relationship between the first and second workers;
  based on the first and second workers being seated for the amounts of time that each exceed the second threshold amount, the computer system increasing second and third weights assigned to first and second nodes, respectively, of the weighted graph that represent the first and second workers, respectively; and
  based on the increased first, second, and third weights, the computer system assigning the first and second workers to first and second chairs, respectively, the first and second chairs being in proximity, wherein the step of assigning results in an enhancement of a collaboration between the first and second workers.

13. A computer system comprising:
  a central processing unit (CPU);
  a memory coupled to the CPU;
  sensors coupled to respective chairs, each sensor configured to detect a presence of a given person sitting on a respective chair;
  radio frequency identification (RFID) scanners attached to the respective chairs, each RFID scanner configured to identify and determine a location of the given person who is in proximity to the respective chair by reading a RFID tag carried by the given person; and
  a computer readable storage device coupled to the CPU, the storage device containing instructions that are executed by the CPU via the memory to implement a method of rearranging assignments of workers to teams in an agile environment to manage energy usage, the method comprising the steps of:
    the computer system collecting requirements of a project and determining skills of workers;
    during a preliminary phase that precedes an execution of the project and based on the requirements of the project and the skills, the computer system generating an initial arrangement of assignments of the workers to the teams;
    during the execution of the project, the sensors detecting that one or more people are sitting on chairs;
    during the execution of the project, the RFID scanners detecting RFID tags carried by the one or more people;
    during the execution of the project and in response to the sensors detecting that the one or more people are sitting on the chairs and the RFID scanners detecting the RFID tags, the computer system obtaining data from the sensors and the RFID scanners which (i) indicates that the one or more people are sitting on the chairs and (ii) identifies the one or more people as being one or more of the workers assigned to the teams, wherein the sensors are coupled to the chairs, respectively, and wherein the obtained data from the sensors is based on the sensors detecting the one or more people sitting on the chairs by detecting, for a given person sitting in a given chair, an increase in pressure exerted on the given chair by the given person;
    during the execution of the project, the computer system obtaining information about a location of the workers from smart devices;
    during the execution of the project, the computer system obtaining content of intranet chat and email communications among the workers;
    during the execution of the project and based on the data from the sensors, the information about the location of the workers, and the content of the intranet chat and email communications, the computer system generating a weighted graph that represents the workers, strengths of relationships among the workers, and strengths of relationships between the workers and the teams;

the computer system obtaining data about energy consumption in rooms and floors in one or more buildings in which the workers work;
the computer system obtaining costs of energy footprints of respective workers, wherein the step of generating the weighted graph is further based on the data about the energy consumption and the costs of the energy footprints of the respective workers;
based on the weighted graph, the computer system determining optimal sizes of the teams and an availability of the chairs for the teams;
based on the weighted graph, the sizes of the teams, and the availability of the chairs, the computer system determining an optimal usage of the chairs and the rooms in the agile environment, which allows one or more rooms that were previously being used to be left empty;
the computer system receiving an indication that the one or more rooms are left empty based on the optimal usage of chairs and the rooms, the empty one or more rooms using less energy than the one or more rooms had used prior to being left empty; and
during the execution of the project, the computer system decreasing an amount of energy used in the one or more rooms that were previously being used and are being left empty by adjusting heating or cooling in the one or more rooms and by automatically and dynamically generating an optimal rearrangement of the assignments of the workers to the teams by using (i) the data about energy consumption in the rooms and the floors in the one or more buildings in which the workers work, (ii) the costs of the energy footprints of the respective workers, and (iii) the weighted graph which represents the workers, the strengths of relationships among the workers, and the strengths of the relationships between the workers and the teams, and which is based on the data obtained from the sensors and the RFID scanners, the information about the location of the workers obtained from the smart devices, and the content of the intranet chat and the email communications among the workers, wherein the optimal rearrangement specifies a match between the skills of the workers and the requirements of the project.

14. The computer system of claim 13, wherein the method further comprises the step of the computer system rearranging the assignments of the workers to the teams based on the optimal rearrangement, wherein a result of the step of rearranging the assignments of the workers to the teams is an increase in productivity of the workers in completing the project, a decrease in a cost of completing the project, or the increase in the productivity and the decrease in the cost.

15. The computer system of claim 13, wherein the step of generating the weighted graph includes:
the computer system generating nodes of the weighted graph, the nodes representing respective workers;
the computer system generating edges of the weighted graph, each edge being between a corresponding two nodes included in the nodes of the weighted graph and representing a relationship between two workers represented by the two nodes;
based on the data from the sensors, the information about the location of the workers, and the content of the intranet chat and email communications, the computer system determining the strengths of the relationships among the workers;
based on the strengths of the relationships among the workers, the computer system determining weights of respective edges of the weighted graph.

16. The computer system of claim 15, wherein the method further comprises the steps of:
based on the data from the sensors, the information about the location of the workers, and the content of the intranet chat and email communications, the computer system determining a first worker currently assigned to a first team and a second worker currently assigned to a second team are in proximity for an amount of time that exceeds a predetermined threshold amount, the first and second teams being different teams;
the computer system determining that a skill of the second worker is included in a set of skills required by a project assigned to the first team;
based on the first and second workers being in proximity for the amount of time that exceeds the predetermined threshold amount and the skill of the second worker being included in the required set of skills, the computer system increasing a weight assigned to an edge of the weighted graph that represents a strength of a relationship between the first and second workers; and
based on the increased weight assigned to the edge of the weighted graph, the computer system reassigning the second worker from the second team to the first team.

17. The computer system of claim 15, wherein the method further comprises the steps of:
based on the data from the sensors, the information about the location of the workers, and the content of the intranet chat and email communications, the computer system determining a first worker is in proximity to a second worker for a first amount of time that exceeds a first threshold amount, the first worker currently assigned to a first team and the second worker currently assigned to a second team, the first and second teams being different teams;
based on the data from the sensors and the information about the location of the workers, the computer system determining the first and second workers are seated in respective chairs for respective amounts of time that each exceed a second threshold amount;
based on the first and second workers being in proximity for the first amount of time that exceeds the predetermined threshold amount, the computer system increasing a first weight assigned to an edge of the weighted graph that represents a strength of a relationship between the first and second workers;
based on the first and second workers being seated for the amounts of time that each exceed the second threshold amount, the computer system increasing second and third weights assigned to first and second nodes, respectively, of the weighted graph that represent the first and second workers, respectively; and
based on the increased first, second, and third weights, the computer system assigning the first and second workers to first and second chairs, respectively, the first and second chairs being in proximity, wherein the step of assigning results in an enhancement of a collaboration between the first and second workers.

* * * * *